(12) United States Patent
Alexander et al.

(10) Patent No.: US 9,247,396 B2
(45) Date of Patent: Jan. 26, 2016

(54) CONTROLLED FLOODING MECHANISM TO FACILITATE MESSAGE BROADCAST IN WIRELESS MULTIHOP NETWORKS

(71) Applicant: Cooper Technologies Company, Houston, TX (US)

(72) Inventors: Roger Alexander, Rockville, MD (US); Shravan Rangaraju, Clarksburg, MD (US); James Livingston, Olney, MD (US)

(73) Assignee: Cooper Technologies Company, Houston, TX (US)

( * ) Notice: Subject to any disclaimer, the term of this patent is extended or adjusted under 35 U.S.C. 154(b) by 186 days.

(21) Appl. No.: 13/839,173

(22) Filed: Mar. 15, 2013

(65) Prior Publication Data

US 2014/0269704 A1    Sep. 18, 2014

(51) Int. Cl.
*H04W 4/06* (2009.01)
*H04L 12/721* (2013.01)
*H04W 56/00* (2009.01)

(52) U.S. Cl.
CPC ............... *H04W 4/06* (2013.01); *H04L 45/32* (2013.01); *H04W 56/001* (2013.01)

(58) Field of Classification Search
USPC ......... 370/312, 338, 336, 389, 390, 394, 400, 370/392, 230, 328, 310, 231, 395.1, 235
See application file for complete search history.

(56) References Cited

U.S. PATENT DOCUMENTS

| 7,545,811 | B2 | 6/2009 | Taha |
|---|---|---|---|
| 7,916,666 | B2 | 3/2011 | Yoon et al. |
| 8,270,302 | B2 | 9/2012 | Chu et al. |
| 2002/0137459 | A1 | 9/2002 | Ebata et al. |
| 2002/0159387 | A1 * | 10/2002 | Allison et al. ................ 370/229 |
| 2004/0022221 | A1 | 2/2004 | Chwieseni et al. |
| 2005/0080858 | A1 | 4/2005 | Pessach |
| 2007/0121521 | A1 | 5/2007 | D'Amico et al. |

(Continued)

FOREIGN PATENT DOCUMENTS

WO    WO 2009/129144 A2 * 10/2009 ............ H04W 48/12

OTHER PUBLICATIONS

Tseng et al., "The Broadcast Storm Problem in a Mobile Ad Hoc Network," Wireless Networks, 8, 153-167, 2002, 15 pages.

(Continued)

*Primary Examiner* — Habte Mered
*Assistant Examiner* — Rownak Islam
(74) *Attorney, Agent, or Firm* — Patterson Thuente Pedersen, P.A.

(57) ABSTRACT

In a wireless multihop network having node devices within communication range neighboring node devices in a corresponding local neighborhood, the node devices initiate repeated message broadcasts of a first message as a connection-less broadcast into the local neighborhood. Initiation of message broadcasts is governed such that the message broadcasts are permitted only at specified transmission times within a plurality of transmission time windows. Each of the node devices determines whether any of the connection-less-broadcasted messages are duplicates of the first message, and generate a count of those duplicates received during each of the transmission windows. Based on counts of the duplicates, initiation of a message broadcast of the first message in a current transmission window is suppressed in response to a corresponding count of duplicates of the first message received during the first transmission window exceeding a suppression limit.

15 Claims, 9 Drawing Sheets

(56) References Cited

U.S. PATENT DOCUMENTS

| | | | |
|---|---|---|---|
| 2010/0149983 A1* | 6/2010 | Lee et al. .................. 370/235 |
| 2010/0157889 A1 | 6/2010 | Aggarwal et al. |
| 2010/0302947 A1 | 12/2010 | Leppanen et al. |
| 2011/0080869 A1 | 4/2011 | Walton et al. |
| 2011/0202947 A1* | 8/2011 | Gupta et al. ................ 725/14 |
| 2011/0206020 A1* | 8/2011 | Hollick et al. .............. 370/337 |
| 2012/0063370 A1* | 3/2012 | Worrall ..................... 370/280 |
| 2012/0155353 A1* | 6/2012 | Ohlenbusch et al. ......... 370/311 |
| 2012/0300758 A1* | 11/2012 | Turunen et al. ............. 370/338 |
| 2013/0217332 A1* | 8/2013 | Altman et al. ............. 455/41.2 |
| 2014/0086145 A1* | 3/2014 | Ramkumar et al. .......... 370/328 |

OTHER PUBLICATIONS

PCT/US2014/011253, Search Report and Written Opinion, dated May 19, 2014, 13 pages.

\* cited by examiner

CONTROLLED FLOODING MECHANISM TO FACILITATE MESSAGE BROADCAST IN WIRELESS MULTIHOP NETWORKS

FIELD OF THE INVENTION

The invention relates generally to data communications via wireless multihop networks and, more particularly, to message dissemination using a flooding protocol for broadcast messages.

BACKGROUND OF THE INVENTION

A wireless multihop communications network, such as a mesh network, includes a set of node devices capable of exchanging messages with one another over a wireless medium, typically using radio frequency (RF) communications. Each of the node devices can be primarily a communications device or, alternatively, the communications functionality may be secondary to its primary function. For example, in a given node, the communications circuitry can be a part of a device such as a computer system, a smart appliance, a vehicle, a media device, a piece of industrial equipment (e.g., an instrument, machine, sensor, actuator), and the like. In a mesh architecture the node devices are uniquely addressable, and able to route messages from an originating node device toward the intended destination node. In general, each of the node devices can be an originating and destination node device as well. Thus, node devices perform both, message forwarding, and message origination/consumption functions. This means that the communication channels can be quite busy at certain parts of the network where the message density is relatively higher than at other parts.

Wireless networks in particular face other challenges. For instance, wireless links may not always be reliable: there may be intermittent interfering signals, intermittent obstructions, including large movable objects (e.g., vehicles) moving in and out of the transmission path, weather affecting the quality of radio signal propagation, etc., affecting the signal strength of transmissions seen by the receiving node. Also, certain node devices may be situated near the limits of their radio's communication range, which further compounds signal reception challenges.

Wireless mesh applications need a broadcast transport mechanism to send messages to all or a large set of node devices in the network in a short period of time. Typical communications between node devices are sent using a connection-oriented protocol in which there is a handshaking process of negotiation between node devices before normal communication over the channel begins. Handshaking dynamically sets parameters of a communications channel established between the two node devices. It follows the physical establishment of the channel and precedes normal information transfer. Although connection-oriented communications can be made reliably, the overhead associated with the handshaking can make this mechanism less efficient for the sending of short messages to all nodes in a network. Accordingly, a connection-less (i.e., without the need to establish individual link connections) broadcast transport mechanism is preferable for the wide-scale dissemination of short messages.

Supporting message broadcast in a wireless mesh network has several challenges. For instance, wireless links may be individually unreliable and communications without dedicated connections may be insecure. Moreover, intended recipients may be multiple hops away from the originator of the message, requiring the broadcasts to be re-transmitted to the next hop so that the message can be propagated throughout the network. This activity takes up communications resources, and if not suitable controlled can overload the communication channel. Furthermore, node density may vary across multiple networks and even within the same network. In dense environments, simultaneous message broadcasts sent by different devices within close proximity can interfere with one another, resulting in a "collision" of radio packets that prevents reception of one or more of the broadcasts.

Therefore, a practical solution is needed to provide effective and efficient message broadcasting throughout a wireless network or sub-network that addresses one or more of these challenges.

SUMMARY OF THE INVENTION

One aspect of the invention is directed to a node device for use with a wireless multihop network containing a plurality of other node devices, with each node device being within wireless communication range of one or more neighboring node devices located in a corresponding local neighborhood. A node device according to one embodiment includes communication circuitry, and a controller interfaced with the communication circuitry. The controller includes a processor and a non-transitory data storage medium containing instructions executable on the processor. When executed, the instructions cause the controller to implement a message broadcast module.

In one embodiment, the message broadcast module includes a broadcast transmission module that repeatedly initiates a message broadcast of a first message by supplying the first message to the communication circuitry for transmission as a connection-less broadcast into the local neighborhood. Operation of the broadcast transmission module is governed by a broadcast decision module that prescribes initiation of message broadcasts at specified transmission times within a plurality of transmission time windows. A timekeeping module maintains a time reference that relates to other node devices of the wireless multihop network. A broadcast reception module obtains connection-less-broadcasted messages received by the communication circuitry. A received message response module detects whether any of the broadcasted messages obtained by the broadcast reception module are duplicates of the first message, and generates a count of those duplicates received during each of the transmission windows.

The broadcast decision module further governs operation of the broadcast transmission module based on counts of the duplicates generated by the received message response module. Accordingly, the broadcast decision module causes the broadcast transmission module to suppress initiation of a message broadcast of the first message in a current transmission window in response to a corresponding count of duplicates of the first message received during the first transmission window exceeding a suppression limit.

In a related aspect of the invention, a method of operating a node device such as the one described above includes:
  initiating repeated message broadcasts of a first message, including supplying the first message to the communication circuitry for transmission as a connection-less broadcast into a local neighborhood;
  governing the initiation of message broadcasts such that the message broadcasts are permitted only at specified transmission times within a plurality of transmission time windows;

maintaining a time reference that relates to and may be roughly common with other node devices of the wireless multihop network;

receiving connection-less-broadcasted messages from the local neighborhood; and detecting whether any of the connection-less-broadcasted messages are duplicates of the first message, and generating a count of those duplicates received during each of the plurality of transmission time windows, wherein governing the initiation of the message broadcasts is based on counts of the duplicates, such that initiation of a message broadcast of the first message in a current transmission time window is suppressed in response to a corresponding count of duplicates of the first message received during the first transmission window exceeding a suppression limit.

Advantageously, with the benefit provided by the embodiments of this invention, message broadcast flooding does not depend on neighbor information. Routing information is used only for optimizations and not for actually being able to broadcast a message. High-density neighborhoods of node devices are better managed by the judicious use of the airwaves through the automated self-regulation of individual node broadcasts based on the number of locally observed broadcasts. Also, the approaches allow for localized broadcasts where the number of re-broadcast hops (distance) can be controlled. Additionally, certain approaches support the capability to have broadcast flow directed away from or towards a centralized network node i.e., a gateway associated with the unicast connectivity of an ad hoc network. These advantages do not all need to be realized together in a practical embodiment, although they certainly may be. Also, other advantages will become apparent from the following detailed description.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE EMBODIMENTS

A multihop network is one where node devices transmit data messages to one another, including through intermediate node devices that can act as routing devices for purposes of relaying data messages towards their final destination, which can be an endpoint node device on the local network, or a gateway node device that provides a connection between the local network and another network. A well-known example of a multihop network is the mesh network topology. Embodiments of the invention may be used in a variety of applications involving data communications. One such application is in energy metering, such as a radio frequency (RF) Mesh advanced metering infrastructure (AMI) network that can provide utilities with a single integrated-mesh network for electric, water and gas data communications with the ability to support multiple meter vendors. Such systems can be deployed using a licensed or unlicensed RF band. However, it should be understood that the principles of the invention are applicable in a variety of different applications besides energy metering.

Figure 1:
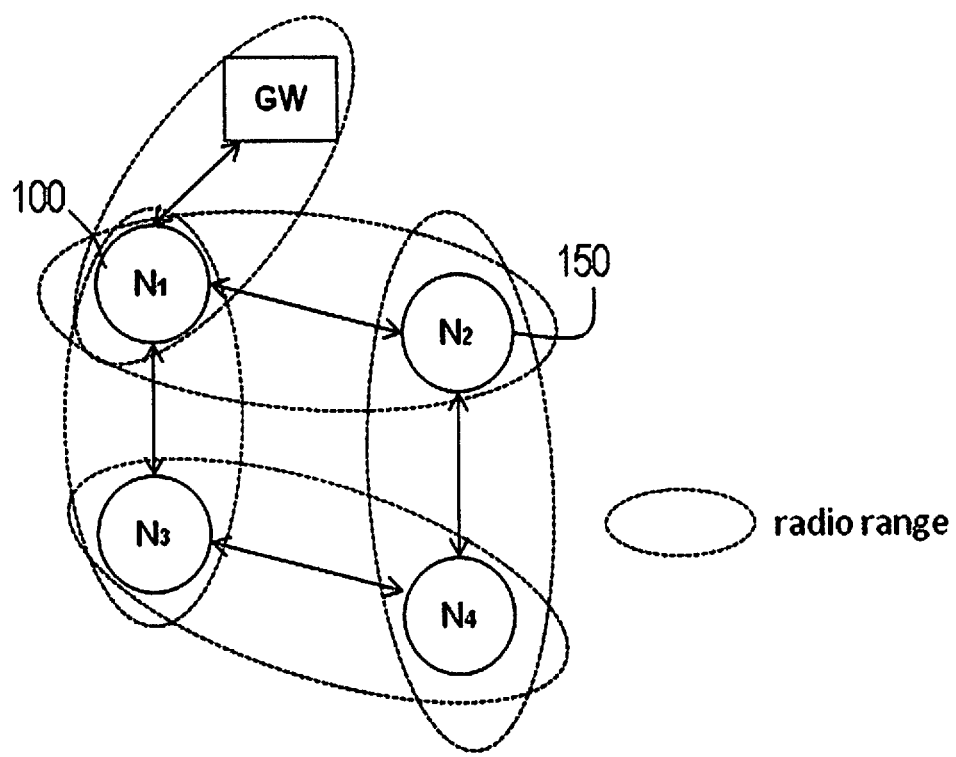
FIG. 1 is a network topology diagram illustrating an exemplary wireless multihop network in which embodiments of the invention may be applied.

FIG. 1 is a diagram illustrating an exemplary wireless multihop network. Endpoint node devices $N_1$-$N_4$ act as sources and destinations of data to be communicated, as well as relays of data to be forwarded to its destination. Gateway node device GW provides a connection between the local network and another network. The areas shown in broken lines represent the radio ranges for the various node devices and can each be considered as a local neighborhood network. Those node devices which are within radio range are referred to herein as neighboring devices or, simply, neighbors. Thus, devices $N_1$ and $N_2$, within communications range of each other, are indicated respectively by reference numerals 100 and 150.

Figure 2:
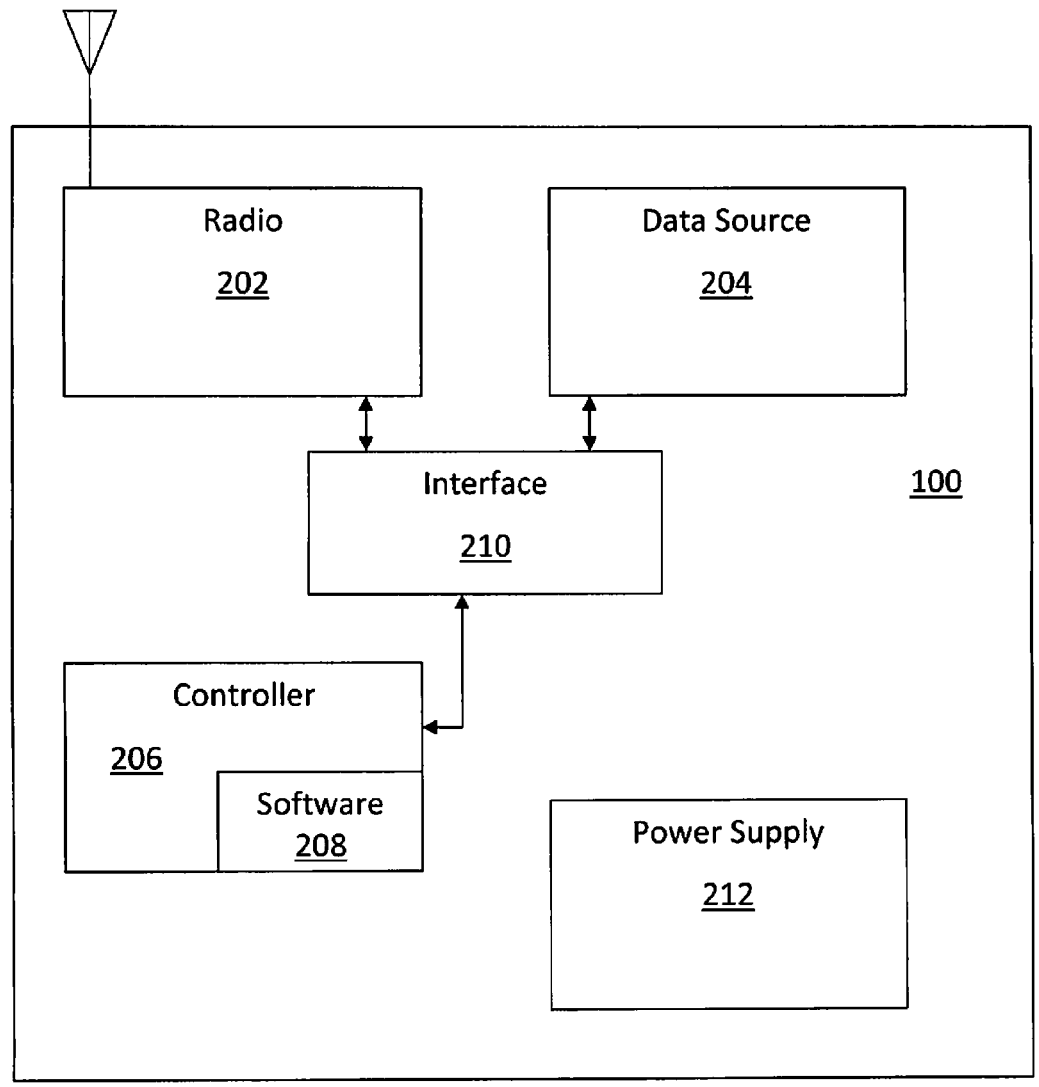
FIG. 2 is a block diagram illustrating parts of an exemplary node device according to one embodiment of the invention.

FIG. 2 is a block diagram illustrating portions of node device 100. Node device 100 includes radio circuit 202 having transmitter and receiver portions. In one example embodiment, the radio circuit is a 50-channel frequency hopping spread spectrum radio. Data source 204 is that portion of node device 100 which is served by radio circuit 202, and provides any one or more of a variety of primary functions of node device 100 besides the communication function. For example, in an AMI application, data source 204 may be a utility meter; in an industrial control application, data source 204 may be an instrument, sensor, or actuator; in an information technology application, data source 204 may be a computer system.

Controller 206 oversees and coordinates functionality of radio circuit 202 and, in some architectures that integrate the communications portion and data source portions of node device 100, controller 206 controls the operation of data source 204. In other embodiments, data source 204 can have its own controller. In one embodiment, controller 206 includes processing hardware, such as one or more processor cores, memory units (volatile, non-volatile, or both), input/output facilities, data bus, and other such processing-related components. Controller 206 also includes software 208, which in various embodiments can include an embedded system, an operating system, device drivers, and other system code. In addition, software 208 includes application-level code that defines the higher functionality of node device 100, including operation of the communications and software upgrade modules detailed hereinbelow. Interface circuit 210 facilitates input and output of application and control data between radio circuit 202 and data source 204 according to the embodiment depicted in FIG. 2. In one embodiment, interface circuit 210 includes an digital to analog (D/A) or analog to digital (A/D) circuit, or both. In related embodiments, interface circuit 210 can include one or more of a bus circuit, a serial port, a parallel port, or any combination thereof.

Power supply circuit 212 provides electrical power for use by the other circuitry of node device 100. Various circuitry may have different power requirements, such as different supply voltages, source or ground isolation, or the like. Accordingly, power supply 212 provides the needed power requirements. In one embodiment, power supply circuit 212 includes the energy source, such as a battery, for example. In other embodiments, power supply 212 includes a power capture circuit such as a photovoltaic cell, for example, or an electrical generator circuit. In still other embodiments, power supply circuit 212 relies on externally-supplied power, such as from an AC mains source, and converts and conditions that power to the various supply taps for the other portions of node device 100.

Figure 3:
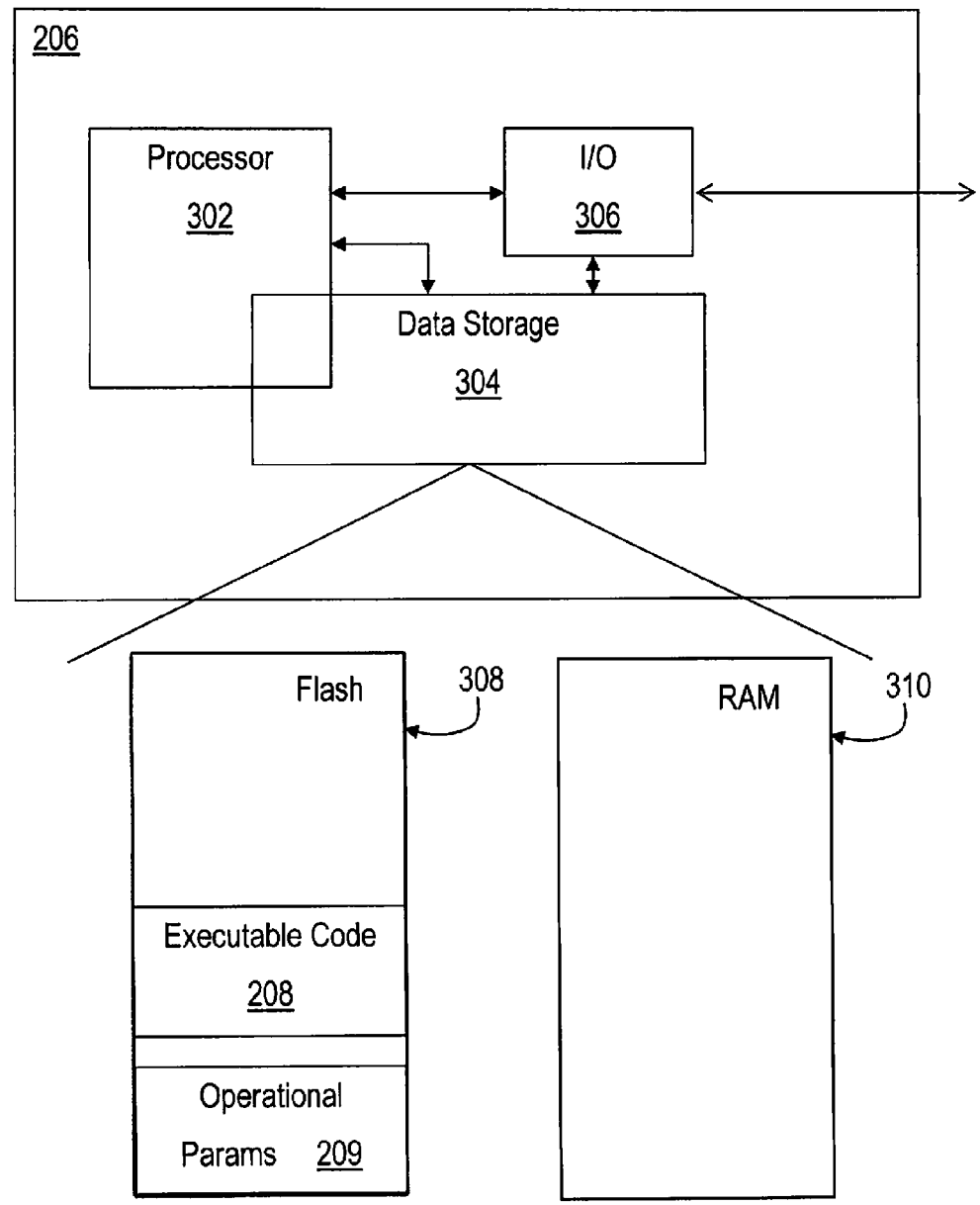
FIG. 3 is a block diagram illustrating parts comprising the controller of the exemplary node device of FIG. 2, including a data storage medium with program instructions and operational parameters.

FIG. 3 is a block diagram illustrating some of the components of controller 206 according to one embodiment. Controller 206 includes processor 302, which includes such parts (not shown) as a control unit, an arithmetic/logic unit (ALU), registers, cache memory, and the like. Processor 302 can include a single or multi-core processor of any suitable architecture (e.g., RISC/CISC), a microcontroller with integrated additional components, a digital signal processor (DSP), etc. Processor 302 is interfaced with data storage 304, which can take any of a variety of suitable forms, and their combinations. For example, RAM, electrically-erasable programmable read-only memory (EEPROM)—e.g., Flash, disk, and the like, or a combination thereof. In the case of a microcontroller embodiment, some of the data storage 304 may be integrated with the control unit and ALU, and other components, as represented by the partial overlap of these blocks in FIG. 3. Some parts of the data storage 304 may be situated externally to the processor 302. Input/output facilities 306 include circuitry such as a system bus interface that permits interfacing with other components of node device 100, including some portions of data storage 304 (such as the case with an external flash device interfacing via system bus).

Also depicted in FIG. 3 is an exemplary organization of content within data storage 304 according to one embodiment. In this example, data storage 304 includes a non-volatile memory devise, such a flash device 308, which may be part of a microcontroller embodiment of processor 302, or external to processor 302. Flash device 308 stores the executable code of software 208, along with operational parameters 209, and other variables that may be stored in the course of execution of software 208. Data storage 304 may also include a random access memory (RAM) device 310, which may be used to store parts (or all) of executable code 208 for faster access during execution, as well as "scratchpad" memory space.

With reference specifically to the functionality implemented by controller 206 operating under the control of the program instructions of software 208, a variety of operational modules are implemented. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor core(s) of controller 206. Accordingly, each module can be realized in a variety of suitable configurations, and should not be limited to any particular implementation exemplified herein.

The operational modules in one example embodiment, include such operations as communications (including forming message packets, forwarding messages addressed to other devices, message routing, error detection/correction, packet framing, following communications protocol, etc.), operation of data source 204, various security-related operations, receiving and processing commands, performing software upgrading-related operations, and others.

Table 1 below lists a set of abstraction layers that implement major portions of the communications functionality according to one embodiment. Although the abstraction layers describe a software architecture, it should be noted that the software architecture configures the controller hardware into a plurality of functional modules.

TABLE 1

Exemplary Abstraction Layers

| Layer | Data unit | Primary function(s) |
|---|---|---|
| Application | Data | Network process to data source |
| Network | Packet | Packetization of data; routing path determination |
| | | Radio Abstraction Interface (RAI) |
| SAR | Segment | Segmentation and reassembly of packet segments |
| MAC | Frame | Coordination of the link state between two devices, including when link access may and may not occur; frame level authentication, and data reliability. |
| Link | Frame | Parsing and packing frames; connection/synchronization and reliable data delivery |

The application layer provides the communication system interface for data source 204. Accordingly, the application layer processes are passed data from data source 204 to be transmitted via radio circuit 202, and provide data received to data source 204 in the appropriate format. The network layer serves the application layer primarily by packetizing data for transmission. Packets generally contain portions of the data as a payload, and further include control information for routing the packet and reassembling the data it contains. In this exemplary implementation, routing is performed at the network layer. The radio abstraction interface (RAI) translates standardized function calls by the network layer to radio-specific or protocol-specific instructions for lower layers, and vice-versa. This allows the application and network layer codes to be universal to all radios and protocols which support the RAI.

The segmentation and reassembly (SAR) layer applies further coding to packets and, in dome implementations, further divides the packets. The medium access control (MAC) layer coordinates the link state between two devices, including when link access may and may not occur. In one embodiment, the MAC layer maintains a link connection state machine and insures the reliable delivery of data traffic via ACK/retransmission procedures. In a related embodiment, the MAC layer provides the mechanism to insure that the link is properly authenticated and lays the basis for establishing encrypted communications before data traffic is allowed to traverse the link.

The link layer provides lower-layer services to the MAC layer. In one such embodiment, the link layer handles the details of the link layer protocol, including parsing and packing the data messages into frames. In addition, link layer implements the connection/synchronization and reliable data delivery procedures.

In certain embodiments, messages that are communicated between node devices are generally sent using a connection-oriented protocol in which there is a handshaking process of negotiation between node devices before normal communication over the channel begins. Handshaking dynamically sets parameters of a communications channel established between the two node devices. It follows the physical establishment of the channel and precedes normal information transfer. Typically, this functionality is handled at the lower layers (i.e., MAC or link layer).

Figure 4:
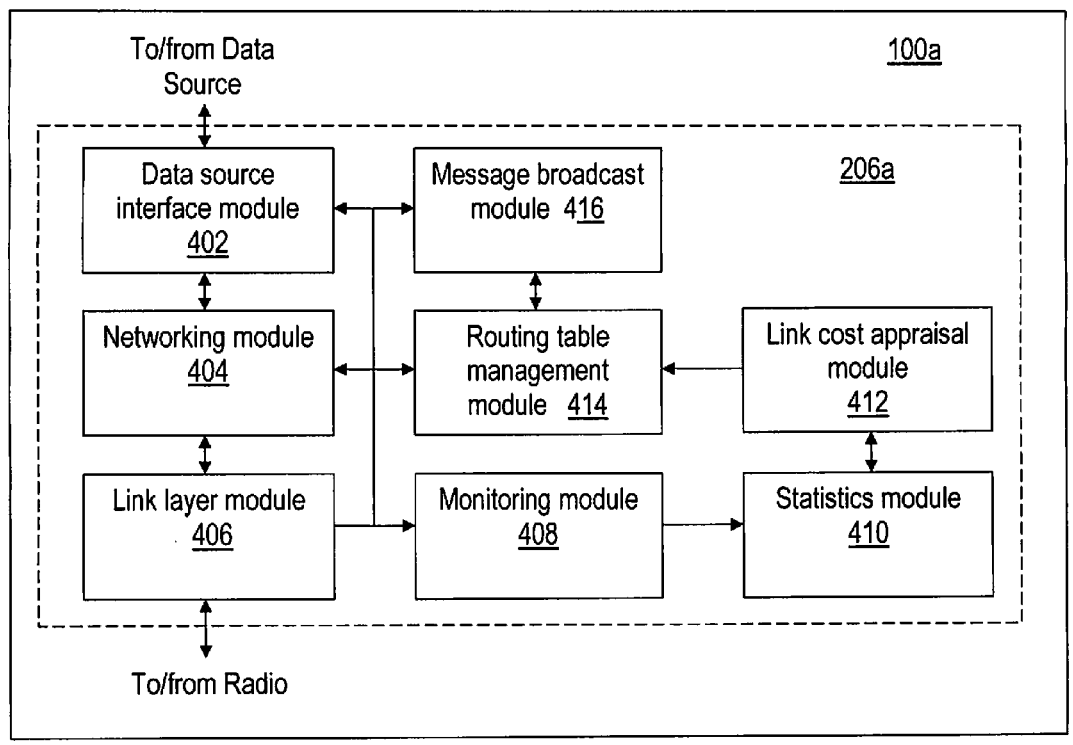
FIG. 4 illustrates some of the functional modules of the exemplary node device of FIG. 2, including a message broadcast module, according to one embodiment.

Referring now to FIG. 4, some of the functional modules of an exemplary node device 100a according to one embodiment are illustrated. In the embodiment shown, node device 100a includes controller 206a with which modules 402-414 are realized. Data source interface module 402, which may be regarded as operating primarily at the application layer, exchanges raw data with the data source portion. Networking module 404, operating primarily at the network layer, performs packetization of data and routing functionality.

Link layer module 406 interfaces with the radio circuit and operates primarily at the link layer, carrying out the link layer operations described above. Monitoring module 408 monitors one or more transmission performance parameter, such as retransmissions, ACKs sent, failures to receive ACKs, data rate achieved, or other such observable parameter. This monitoring is performed based on transmissions sent using a connection-oriented protocol.

Statistics module 410 collects multiple samples of the transmission performance parameter values obtained by monitoring module 408, and performs a statistical summary of those multiple values. In one embodiment, the statistical summary represents a statistical summary, such as an average value, median value, or most frequent value. In a related embodiment, the summary statistic is weighted, for instance, a running average with greater weight attributed to more recent values.

Link cost appraisal module 412 performs the computation of link cost based on the statistical data for the actual communications links. The link cost metric in one embodiment can be expected transmission count (ETX). In other embodiments, other metrics, or combinations of metrics, may be utilized.

The link cost value is passed to routing table management module 414, which updates the routing information according to the predetermined link cost-based algorithm for routing. Networking module 404 makes reference to routing table management module 414, and performs updates of the routing tables as needed. In delivering data messages, the wireless network of FIG. 1 performs a dynamic routing scheme.

According to one aspect of the present invention, message broadcast module 416 is configured to perform operations relating to the use of a message flooding protocol for efficiently and effectively disseminating messages using a connection-less message format. Such operations involve the broadcasting and re-broadcasting of messages, as well as receiving broadcast messages and determining how to handle those received messages according to the message flooding protocol.

Figure 5:
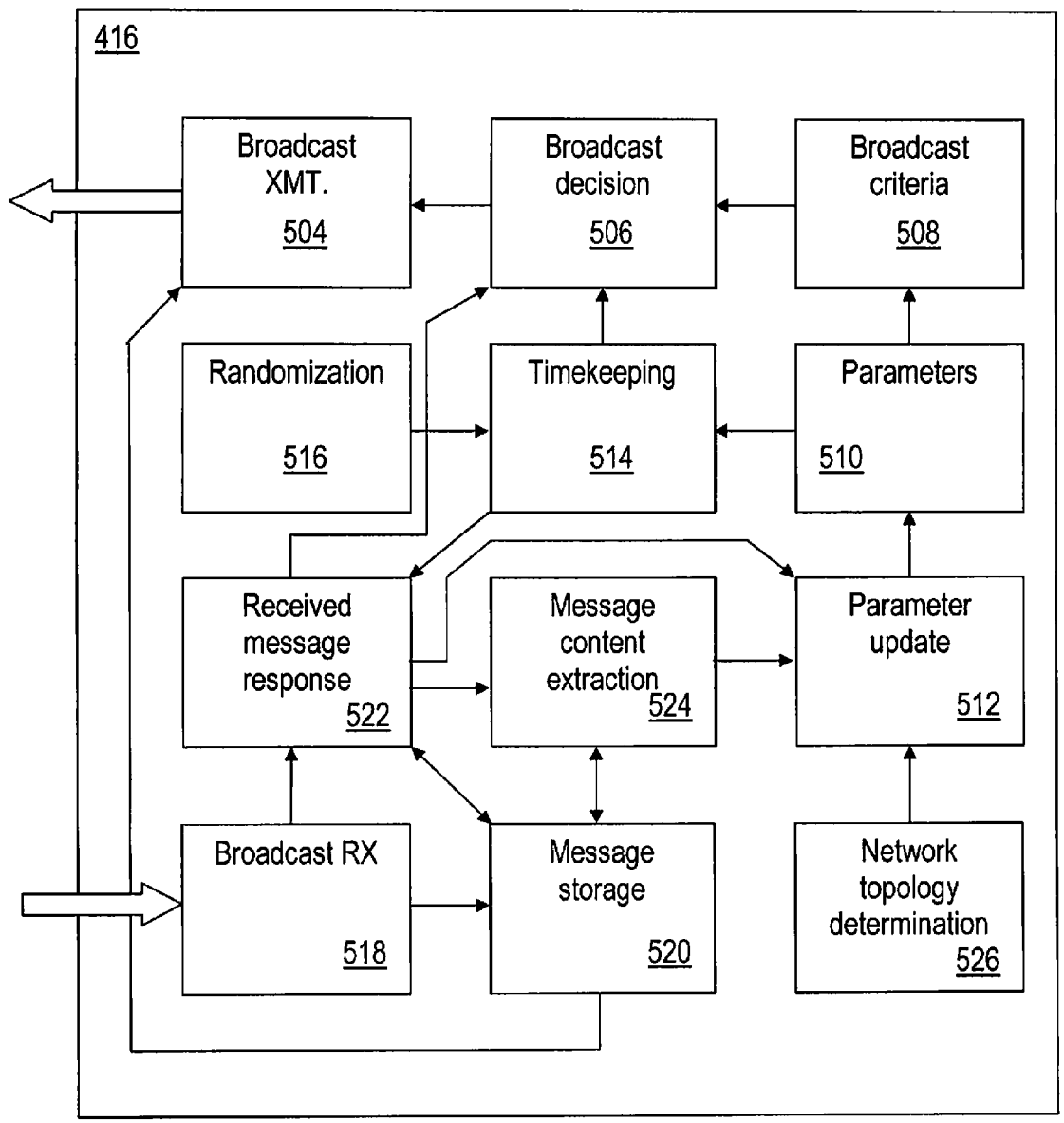
FIG. 5 is a block diagram illustrating an exemplary structure of modules that make up the broadcast module of the embodiment of FIG. 4, according to one embodiment of the invention.

FIG. 5 is a block diagram illustrating an exemplary structure of modules that make up broadcast module 416 according to one embodiment. Broadcast transmission module 504 creates broadcast (or re-broadcast) messages and passes them on to the communications modules to be further packetized, framed, etc., and transmitted via radio 202. As indicated above, the broadcast message format and protocol define a connection-less communications mode. According to the broadcast flooding protocol of certain embodiments, broadcast messages are repeated according to certain criteria to improve reliability and to meet the requirements of the specified delivery. Although the message flooding protocol according to certain embodiments does not ensure a fully-reliable message delivery, the use of re-broadcasts (i.e., repeats) of a given message increases the probability that the broadcast is received by a sufficient number of neighbors so that the flooding can be propagated further.

Operation of broadcast transmission module 504 is governed by broadcast decision module 506. Broadcast decision module 506 causes broadcast transmission module 504 to either initiate a transmission (i.e., take actions that result in transmission of the message broadcast), or to remain idle (i.e., forgo taking any action). Broadcast decision module 506 makes its determination based on decision criteria maintained by broadcast criteria module 508. In one embodiment, the criteria includes temporal criteria, i.e., based on timing parameters, and action criteria that define whether to send or not send the broadcast message.

In one type of embodiment, the temporal criteria define transmission time windows during which at least one broadcast is allowed to be sent (if the action criteria are met), and a transmission time within each window. In one embodiment, at most, only a single broadcast message can be transmitted within each transmission window.

In a related embodiment, the action criteria include limits on: the number of times a message may be repeated in successive rebroadcasts, the number of transmission windows that may be used to transmit a message, and the age of a message (i.e., expiration criteria). Examples of how these criteria may be applied are detailed below.

In another related embodiment, the action criteria further includes a message suppression functionality designed to limit transmissions of a message in response to how actively neighboring node devices in the network are already transmitting the same message at certain moments. This message suppression functionality therefore provides a dynamic action criteria that allows the node device to refrain from transmitting the broadcast message when the message is already being actively transmitted within the local neighborhood. This helps to relieve congestion of the airwaves due to repeated broadcasting of messages by numerous node devices.

The criteria managed by broadcast criteria module 508 is adjustable according to one type of embodiment. Accordingly, parameters module 510 stores adjustable parameters, such as the limits on message repeats, limits on transmission windows, suppression function criteria, transmission window durations, priority biases in the selection of time randomization, etc. Parameter update module 512 contains rules for dynamically adjusting the parameters based on defined events or received information.

For example, different parameter values may be used for different types of broadcast messages. Thus, messages deemed more critical, more time-sensitive, or both, may be subject to an increased number of repetitions, shorter transmission time windows, relaxed suppression criteria, etc.

Also, different parameter values may be self-selected by devices based on the location of the node device in the network relative to gateway devices and other node devices. For example, node devices having more descendant nodes (i.e., node devices which are essential hops to the serving gateway for many tiers of "descendent" devices) may be deemed more important to increasing reliability of broadcast delivery, and the parameters 510 may be adjusted accordingly. Similarly, node devices having small neighborhoods may be configured to transmit more repetitions, etc. Where such a control parameter is not configured node devices in any environment will be able to recognize the lower reception of repeated broadcast messages in a given window and will be able to dynamically self-adjust their transmissions. Network topology determination module 526 provides this type of topologic (or message routing-related) information to parameter, derived from the network's unicast routing, to update module 512. In a related embodiment, the network topology information is used for restricting a broadcast message within a given system, within a gateway's segment and also within a particular hop limit.

Timekeeping module 514 is responsible for operating one or more counters, and for maintaining a real-time clock, or at least some clock that represents a common time reference with other devices of the network or subnet. In various embodiments, there is not a strict need for clock synchronization. This can be handled by timing decision modules with the use of a timing tolerance factor, for example.

Randomization module 516 generates a random value (or quasi-random value) that is used by broadcast decision module to determine the transmission time according to one embodiment. The randomization of the transmission time between successive transmission time windows helps to increase the reliability by avoiding repeated collisions due to nearby devices trying to transmit a the same time according to identical timing schedules, for example.

Broadcast reception module 518 receives broadcasted messages from the communication modules. In one embodiment, broadcast reception module monitors all messages and detects when a message is in a broadcast message format. Alternatively, the message type determination can be made by a different module, which then proceeds to pass that received message to broadcast reception module.

Received messages are stored in message storage module 520. This module can utilize any suitable data structure for storing messages, or extracted contents of the messages.

Received message response module 522 detects whether any of the broadcasted messages obtained by broadcast reception module 518 are duplicates of a previously-received message, and generates a count of those duplicates received during each of the transmission windows. Duplicate messages may be determined based on the contents of each message, which may be defined to include an originating node device ID and origination timestamp. Other means for identifying duplicate messages may also be employed, such as the use of a generated unique message ID that remains constant in each copy of a given message. The message suppression functionality described above can rely on the duplicate message detection functionality of received message response module 522 in counting the number of received duplicate messages during monitoring intervals.

In a related embodiment, received message response module 522 also implements security functionality, including testing whether a received message is too old (i.e., its timestamp is older than an age limit), or if its timestamp has some other irregularity (such as whether the timestamp is greater than the current time). In the event of an irregularity, the incoming message can be rejected, or not re-transmitted.

If a new message is accepted, its contents are extracted by message content extraction module 524, and these contents can be passed to the appropriate module implemented by controller 206a or data source 204. Also, message content extraction module 524 can cause the newly-received message to be passed to broadcast transmission module 504 and broadcast decision module 506 for retransmission using the message flooding protocol. Furthermore, extracted contents of the received message can be passed to parameter update module 512 to set the parameters 510 in accordance with the parameter adjustment criteria. Thus, the re-broadcasting of the message using the flooding protocol can be customized for each message type or for the application utilizing the message.

Figure 6:
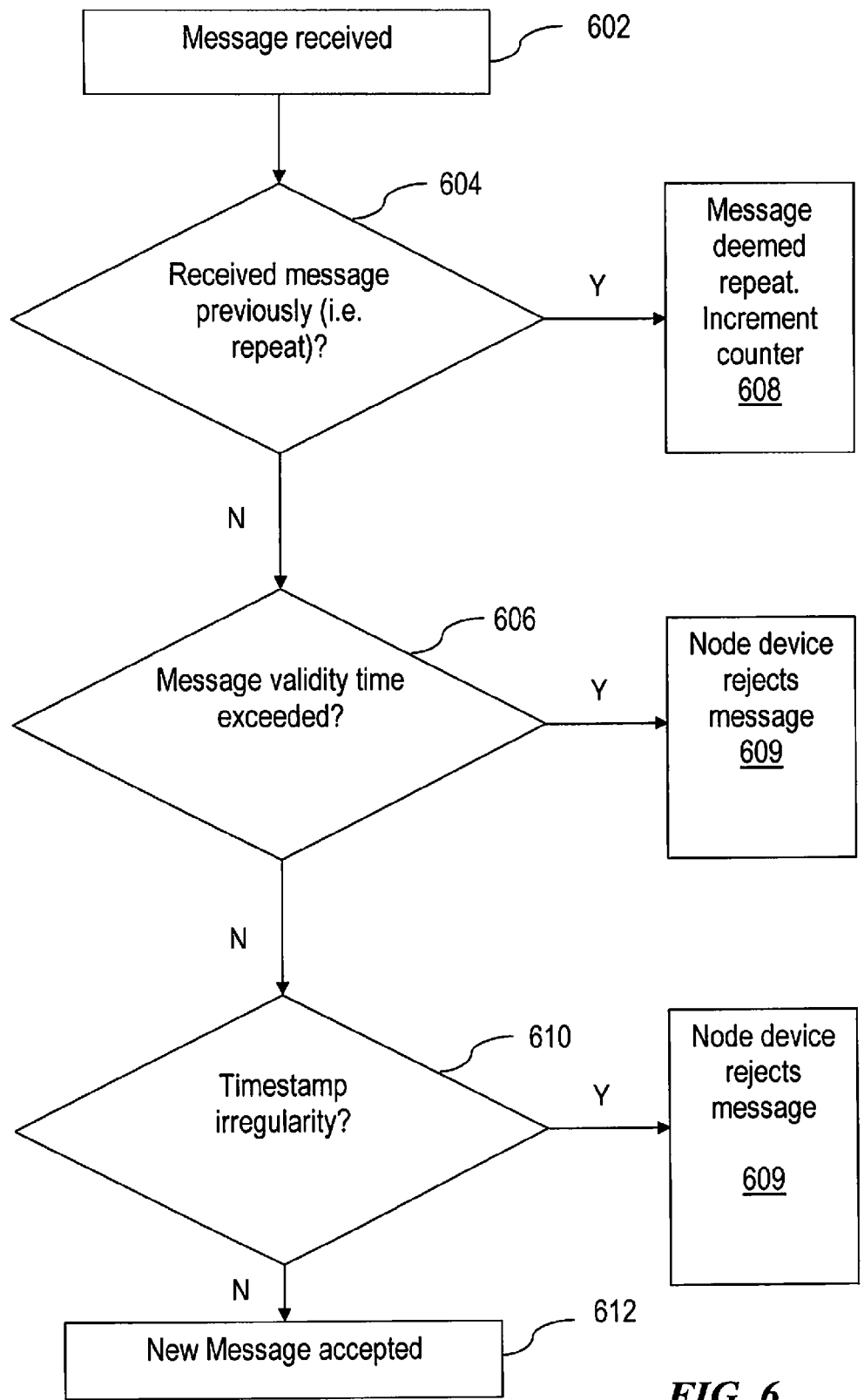
FIG. 6 is a flowchart of a process of filtering received messages to protect against errors, and replay and delay attacks, according to an embodiment.

Referring to FIG. 6, a flow diagram illustrating an example of decision logic for handling incoming messages received at an endpoint node that is configured to detect delay and replay attacks. At 602, a broadcast reception module receives an incoming message. The incoming message is generally in the form of a data frame, with the frame including a header portion that indicates an origination address and timestamp. In an embodiment, a broadcast reception module is initiated each time an incoming message is received at the transmitting endpoint node. At 604, a decision is made to determine if the message received is a duplicate of a previous message received by the endpoint. If the message is not a duplicate, the message is routed to a neighboring endpoint for retransmission. If the message is duplicated, the broadcast decision module terminates initiation of the broadcast based on the adjustable repeat limit and proceeds to 606. At 606, the broadcast decision module verifies the incoming message timestamp and a decision is made to determine if the message has been subject to a delay attack or other inadvertent delay that takes it beyond its validity period. In an embodiment, the receiving endpoint node broadcast decision module is initiated to compare the local node timestamp to the timestamp of the received message. If the local timestamp is lesser in value than the cumulative value of the message timestamp and the preconfigured time period in which the message is valid, the received message response module is initiated. Otherwise, if the timestamp of the endpoint exceeds the cumulative value of the message timestamp and the preconfigured validity period, the broadcast decision module terminates initiation of repeats of broadcasts and proceeds to 610. At 610, the broadcast decision module reads the incoming message origination timestamp and a decision is made to determine if the message arrived at the endpoint node prematurely. In an embodiment, the broadcast decision module terminates initiation of the repeats of broadcasts if the origination timestamp of the message exceeds the local timestamp; otherwise received message response module is initiated.

FIG. 6 is a flow diagram illustrating an example of decision logic for handling incoming messages received at a node device according to one embodiment. At 602, a broadcast reception module receives an incoming message. The incoming message is generally in the form of a data frame, with the frame including a header portion that indicates an origination address and timestamp. At 604, a decision is made to determine if the message received is a duplicate of a previous message received by the node device. If the message is not a duplicate, the received message response module is initiated. If the message is duplicated, a counter is incremented to record the amount of duplicates received during a current monitoring period at 608.

At 606, a decision is made as to whether the validity period of the message has expired. The validity period is a parameter that is associated with the delivery type of the broadcast message that defines a time period, measured from a timestamp of any message, that indicates an expiration time for that message. In an embodiment, the timestamp of a message in question is subtracted from the current time, as tracked by the local timekeeping module. If the difference is greater than the validity period, then the message is deemed expired, and it is rejected at 609.

At 610, various time-wise irregularities, determined within the tolerance of the system-maintained time, are checked. For example, if the current timestamp is lesser in value than the message timestamp, this indicates an irregularity and the message is rejected. Otherwise, the received message is accepted and passed to various other modules for consumption, and re-broadcast according to the flooding protocol.

Figure 7:
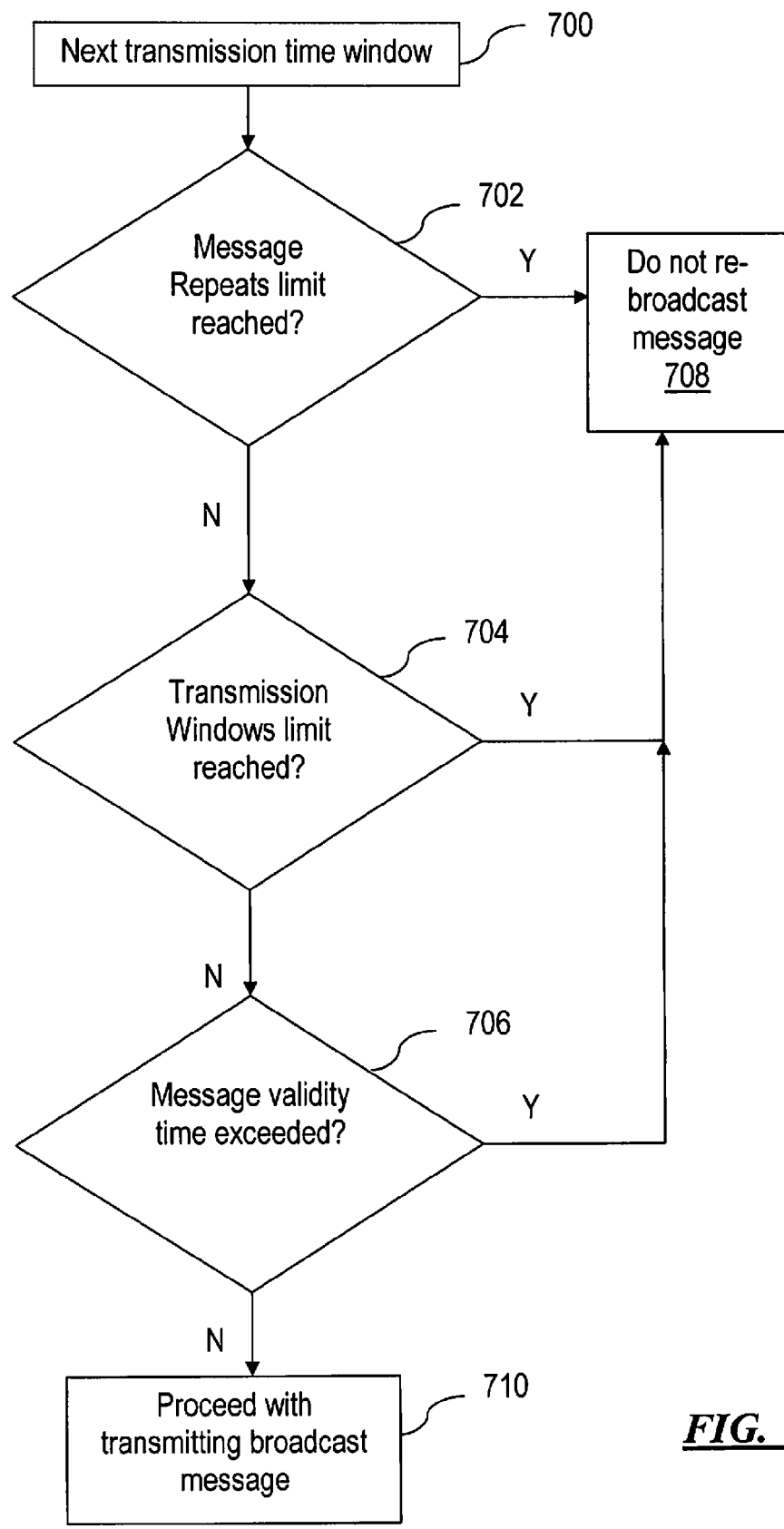
FIG. 7 is a flowchart illustrating an algorithm for controlling message broadcasts, according to an embodiment.

FIG. 7 is a flowchart illustrating an execution of a decision process for determining whether to proceed with transmitting a broadcast message in a transmission time window according to an exemplary embodiment. As discussed above, message broadcasts (or, for messages that were not originated by the local device) re-broadcasts, are carried out on a time window basis. The transmission time windows can be immediately successive, or, there may be some time delay between windows, according to various embodiments.

The decision process of FIG. 7 is called at the start of each transmission time window, as indicated at 700. This can occur at the expiration of a previous transmission time window, or after a time delay following the previous window using a timer. Three inquiries are made in this embodiment. Although a particular order is shown in FIG. 7, the inquiries can be made in any order since they are independent inquiries.

At 702, a broadcast decision module is initiated and a decision is made as to whether the message has already been transmitted enough times based on a set limit that indicates the maximum number of broadcast repeats. This limit can be based on a max_num_repeats parameter specifying such a value. In a related embodiment, a counter that tracks the number of repeats, i.e., num_repeats, is associated with each "live," i.e., non-expired message that is subject to being re-broadcast using the message flooding protocol. Decision 702 can involve comparing the num_repeats for the message against the max-num_repeats limit, for example. If the num_repeats of the broadcast message has reached the limit, the message is not transmitted, as indicated at 708, and its status is changed to a non-live status.

If the repeat limit has not been reached, it remains possible to send the message. However, before that can happen, another decision is made at 704, which determines whether the number of transmission windows has reached a corresponding limit. In one example embodiment, a second counter that indicates the number of transmission time windows that have been processed for a given message, is incremented with each transmission time window. This counter is also message-specific. A max_windows limit is compared, and if the limit is reached, the process loops to block 708.

If the transmission window limit has not been reached, the message may be transmitted, though a third inquiry relating to message aging is made. Accordingly, at 706, a decision is made as in operation 606 above, as to whether the validity period of the message has expired. If the difference between the timestamp of the message origination and the current time exceeds the validity_period parameter, the message is not sent, and its status is changed to expired.

Figure 8:
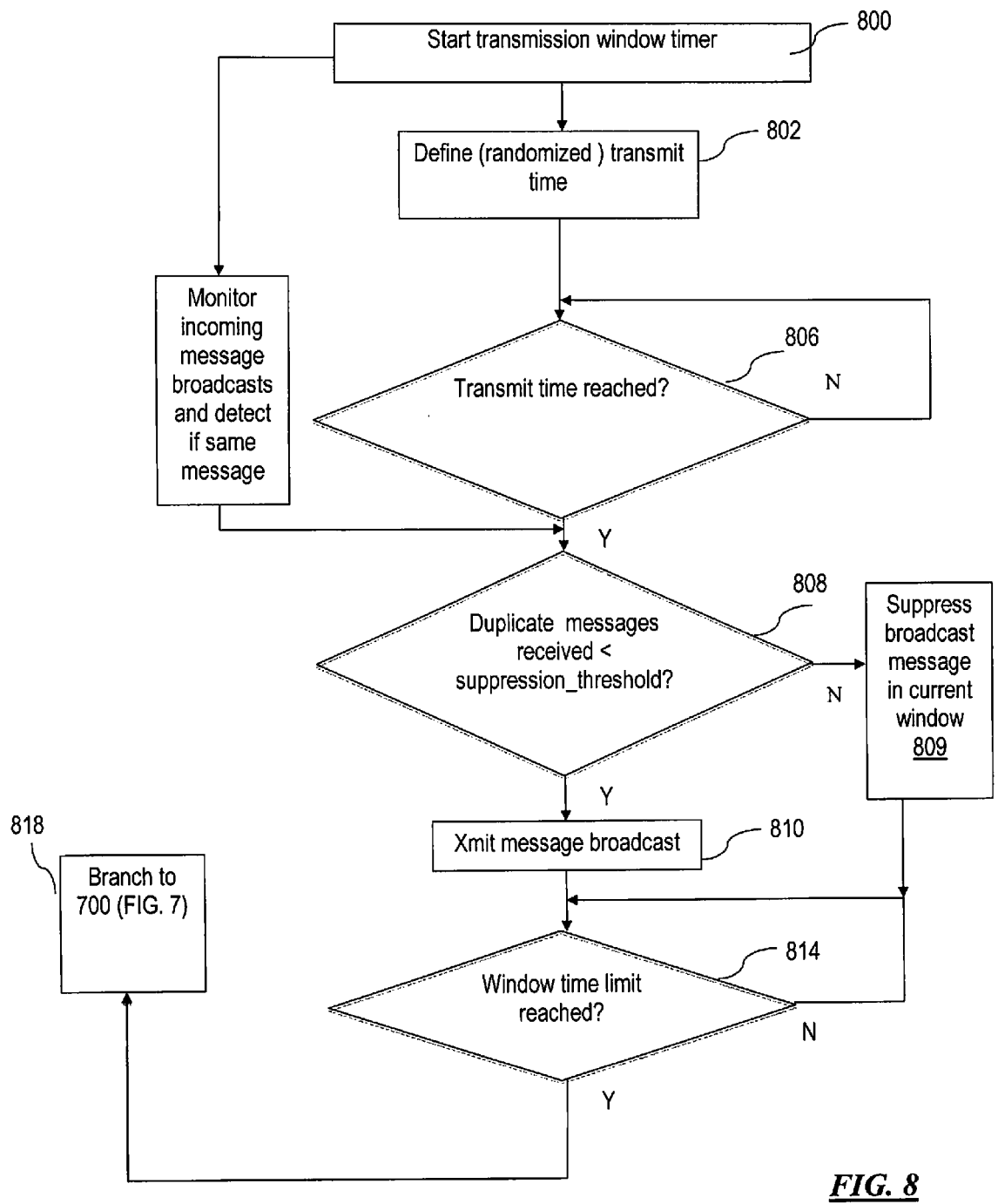
FIG. 8 is a flowchart illustrating an execution of a loop algorithm directed towards broadcast message control, according to an embodiment.

FIG. 8 is a flow diagram illustrating an algorithm for controlling message broadcasts within each transmission time window according to an example embodiment. At 800, the transmission process is initiated and a timer that is used to determine the end time of the current transmission time window is started. At 802, a random time duration is generated within the current transmission time window. This time duration, measured from the start of the transmission window, indicates the message transmission time at which the message broadcast is to take place. Meanwhile, at the start of the transmission time window, incoming messages are monitored to determine if they are the same message as the one to be broadcast in the current transmission time window. A received duplicate messages counter is incremented with each such instance.

At 806, if the process determines if the message transmission time has arrived, the process proceeds to decision 808, where the counted number of duplicate copies of the message is compared against a preset limit, suppression_threshold. If the count of duplicate messages received within the current transmission time window meets or exceeds the suppression_threshold limit, the broadcast decision module 506 suppresses, or prevents, the message from being broadcast in the current transmission time window at 809. In one embodiment, this suppression can be simply a lack of a command to transmit at the designated time.

Otherwise, if the number of repeated messages received does not exceed the suppression threshold value, the message is broadcast at 810. At 814, it is determined whether the transmission window time limit has been reached. When this condition occurs, the process branches to block 700 in FIG. 7 to prepare for the next transmission time window.

Figure 9:
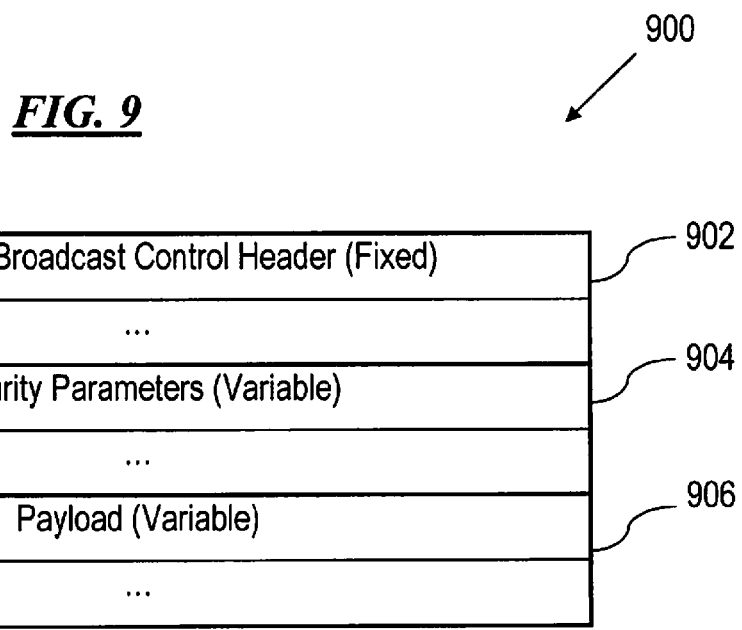
FIG. 9 is a block diagram illustrating a broadcast frame, according to an embodiment.

Referring to FIG. 9, an illustration of a broadcast frame 900 that includes a frame and broadcast control header 902, security parameters 904 and a variable length application payload 906 is shown. The frame header comprises a frame format control, security control, system ID, originator ID, counter and a broadcast control hops and application ID. The frame format control is used to provide information on the source origin of the broadcast frame and to provide an indicator of network-initiated or gateway initiated broadcasts as opposed to endpoint-initiated broadcasts. The frame format control field includes elements such as: reserved bits, a multi-message payload indicator, a broadcast type indicator, directed broadcast control, gateway filter, and a network originator indicator.

In an embodiment, the multi-message payload indicator is used to indicate whether multiple messages are carried within the broadcast payload. This specification provides the option to link multiple messages where the same message has been broadcast as indicated by the broadcast delivery type and application ID. Such linkage permits increased system broadcast transport capacity particularly when handling a high message load. In another embodiment, the directed broadcast control field is used to manage broadcast transmission and suppression based on network topology where messages can be channeled towards or away from designated network points including the network gateway. The use of directed broadcasts provides an additional mechanism for traffic suppression and limiting the impact of broadcast traffic on the network. Another embodiment includes the use of a gateway filter to limit broadcasts to endpoints served by a common gateway by restricting a broadcast frame to the endpoints associated with a specified common gateway.

The embodiments above are intended to be illustrative and not limiting. Other variations are contemplated to fall within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A node device for use with a wireless multihop network containing a plurality of other node devices, each node device being within wireless communication range of one or more neighboring node devices located in a corresponding local neighborhood, the node device comprising:
    communication circuitry, and a controller interfaced with the communication circuitry, the controller including a processor and a non-transitory data storage medium containing instructions executable on the processor, that, when executed, cause the controller to implement a message broadcast module that includes:
        a broadcast transmission module that repeatedly initiates a message broadcast of a first message by supplying the first message to the communication circuitry for transmission as a connection-less broadcast into the local neighborhood, wherein operation of the broadcast transmission module is governed by a broadcast decision module that prescribes initiation of message broadcasts at specified transmission times within a plurality of transmission time windows, and wherein each specified transmission time falls in a last half of a corresponding transmission time window;
        a timekeeping module that maintains a time reference that relates to other node devices of the wireless multihop network;
        a broadcast reception module that obtains connection-less-broadcasted messages received by the communication circuitry; and
        a received message response module that detects whether any of the broadcasted messages obtained by the broadcast reception module are duplicates of the first message, and generates a count of those duplicates received during each of the transmission windows in which the first message is being transmitted;
    wherein the broadcast decision module further governs operation of the broadcast transmission module based on counts of the duplicates generated by the received message response module, wherein the broadcast decision module causes the broadcast transmission module to suppress initiation of a message broadcast of the first message in a current transmission window in response to a corresponding count of duplicates of the first message received during the current transmission window in which the first message is being transmitted exceeding a suppression limit, and wherein the broadcast decision module causes the broadcast transmission module to terminate initiation of a message broadcast of the first message in response to a determination that a current time exceeds an origination time stamp plus a validity time duration associated with the first message.

2. The node device of claim 1, wherein the broadcast transmission module is configured to initiate at most a single message broadcast in each transmission time window.

3. The node device of claim 1, wherein the broadcast decision module varies the specified transmission times such that specified transmission times for subsequent transmission time windows are different in each transmission time window.

4. The node device of claim 3, wherein the broadcast decision module varies the specified transmission times based on a randomization value applied to each transmission window.

5. The node device of claim 1, wherein the node device is a device other than an originator of the first broadcast message.

6. The node device of claim 1, wherein the broadcast decision module terminates initiation of repeats of broadcasts of the first message based on an adjustable repeat limit parameter.

7. The node device of claim 1, wherein the broadcast decision module terminates initiation of repeats of broadcasts of the first message based on an adjustable transmission windows limit parameter.

8. The node device of claim 1, further comprising:
    a parameter adjustment module that adjusts parameters of criteria for governing operation of the broadcast transmission module by the broadcast decision module.

9. The node device of claim 8, wherein the parameter adjustment module is configured to adjust the parameters of the criteria for governing operation of the broadcast transmission module on a message-by-message basis based on contents of each message to be broadcast.

10. The node device of claim 8, wherein a duration of the transmission time windows is a parameter that is adjustable by the parameter adjustment module based on a delivery type indication contained in the first message.

11. The node device of claim 8, wherein a duration of the transmission time windows is a parameter that is adjustable by the parameter adjustment module based on an application associated with the first message.

12. The node device of claim 1, wherein the received message response module is configured to prevent broadcasting of a copy of a received broadcast message if that received broadcast message has been previously received by the node device.

13. The node device of claim 1, wherein the received message response module is configured to prevent broadcasting of a copy of a received broadcast message if a current time exceeds the origination time stamp plus the validity time duration of that received broadcast message.

14. In a wireless multihop network containing a plurality of node devices, each node device being within wireless communication range of one or more neighboring node devices located in a corresponding local neighborhood, a method of operating a node device, the method comprising:

initiating repeated message broadcasts of a first message, including supplying the first message to the communication circuitry for transmission as a connection-less broadcast into the local neighborhood;

governing the initiation of message broadcasts such that the message broadcasts are permitted only at specified transmission times within a plurality of transmission time windows, wherein each specified transmission time falls in a last half of a corresponding transmission time window;

maintaining a time reference that relates to other node devices of the wireless multihop network;

receiving connection-less-broadcasted messages; and detecting whether any of the connection-less-broadcasted messages are duplicates of the first message, and generating a count of those duplicates received during each of the transmission windows in which the first message is being transmitted; and further governing the initiation of the message broadcasts based on counts of the duplicates, and suppressing initiation of a message broadcast of the first message in a current transmission window in response to a corresponding count of duplicates of the first message received during the current transmission window in which the first message is being transmitted exceeding a suppression limit, and terminating initiation of a message broadcast of the first message in response to a determination that a current time exceeds an origination time stamp plus a validity time duration associated with the first message.

15. In a wireless multihop network containing a plurality of node devices, each node device being within wireless communication range of one or more neighboring node devices located in a corresponding local neighborhood, a node device, comprising:

means for initiating repeated message broadcasts of a first message, including supplying the first message to the communication circuitry for transmission as a connection-less broadcast into the local neighborhood;

means for governing the initiation of message broadcasts such that the message broadcasts are permitted only at specified transmission times within a plurality of transmission time windows;

means for maintaining a time reference that relates to other node devices of the wireless multihop network;

means for receiving connection-less-broadcasted messages; and means for detecting whether any of the connection-less-broadcasted messages are duplicates of the first message, and generating a count of those duplicates received during each of the transmission windows in which the first message is being transmitted; and means for further governing the initiation of the message broadcasts based on counts of the duplicates, and suppressing initiation of a message broadcast of the first message in a current transmission window in response to a corresponding count of duplicates of the first message received during the current transmission window in which the first message is being transmitted exceeding a suppression limit, and terminating initiation of a message broadcast of the first message in response to a determination that a current time exceeds an origination time stamp plus a validity time duration associated with the first message.

* * * * *